US007335133B2

(12) United States Patent
Katou et al.

(10) Patent No.: US 7,335,133 B2
(45) Date of Patent: Feb. 26, 2008

(54) CONTROL APPARATUS METHOD FOR AUTOMATIC TRANSMISSION

(75) Inventors: Yoshiaki Katou, Kanagawa (JP); Isamu Ohtake, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 194 days.

(21) Appl. No.: 11/332,159

(22) Filed: Jan. 17, 2006

(65) Prior Publication Data

US 2006/0166789 A1    Jul. 27, 2006

(30) Foreign Application Priority Data

Jan. 21, 2005  (JP)  ............................. 2005-013438

(51) Int. Cl.
  *B60K 23/00*  (2006.01)
  *F02N 11/08*  (2006.01)
  *B60W 10/02*  (2006.01)
  *B60W 10/04*  (2006.01)
  *G06F 7/00*  (2006.01)

(52) U.S. Cl. ......................... 477/167; 477/180; 701/67

(58) Field of Classification Search ................ 477/167, 477/180; 701/67–68
See application file for complete search history.

(56) References Cited

U.S. PATENT DOCUMENTS 6,089,364 A  *  7/2000  Kunii ........................ 192/85 R

| 6,129,188 | A | * | 10/2000 | Friedmann et al. | ........ | 192/3.58 |
| 6,702,716 | B2 | * | 3/2004 | Yamaguchi et al. | ........ | 477/180 |
| 7,080,724 | B2 | * | 7/2006 | Hasegawa et al. | .......... | 192/220 |
| 7,255,664 | B2 | * | 8/2007 | Ohta | .......................... | 477/175 |

FOREIGN PATENT DOCUMENTS

| JP |   63110044 A | * | 5/1988 |
| JP | 2001-349226 A |  | 12/2001 |

* cited by examiner

*Primary Examiner*—Tisha Lewis
(74) *Attorney, Agent, or Firm*—Foley & Lardner LLP

(57) ABSTRACT

A control apparatus for an automatic transmission includes an engine; a torque converter connected with the engine; an oil pump driven by the engine; a starting clutch adapted to be engaged by an engagement pressure produced by the oil pump to transmit propelling power of a vehicle at a start time of the vehicle; and a controller. The controller includes an idle stop control section configured to deactivate the engine when the vehicle is in a stopped state and a predetermined condition is satisfied, and configured to restart the engine when the predetermined condition becomes not to be satisfied. The controller moreover includes an engagement-pressure control section configured to control the engagement pressure while the starting clutch shifts from in a disengaged state to in an engaged state, and configured to carry out a learning control to correct the engagement pressure of the starting clutch in accordance with a state of a creep start of the vehicle in the case where the idle stop control section restarts the engine.

17 Claims, 6 Drawing Sheets

CONTROL APPARATUS METHOD FOR AUTOMATIC TRANSMISSION

BACKGROUND OF THE INVENTION

The present invention relates to control apparatus and method for an automatic transmission equipped with an idle stop function, and particularly to control apparatus and method for a belt-type continuously-variable transmission.

In a vehicle having the idle stop function, a normal combustion (steady-state combustion) of an engine is carried out immediately after a restart of the engine. Hence an engine rotational speed blows up (i.e., rapidly increases) to a speed higher than a required engine speed, and an excessively high torque is inputted to a clutch. Thereby, there is a possibility that a vibration and an abrupt burst-out of the vehicle are generated.

A Japanese Patent Application Provisional Publication No. 2001-349226 published on Dec. 21, 2001 exemplifies a previously proposed technique in a vehicle equipped with the idle stop function. In this technique, a regenerative motor absorbs (uses) the engine speed higher than the required engine speed in order to avoid the input of the excessively high torque to the clutch, after the engine is restarted.

SUMMARY OF THE INVENTION

However in the above-described technique, since the regenerative motor having a high regenerative ability is necessary in general, the cost increases accordingly. On the other hand, it is also conceivable in order to avoid the input of the excessively high torque into the clutch at the time of restart of the vehicle, that an engagement capacity of the clutch is set at a value corresponding to a creep pressure immediately after the restart of the engine by accurately controlling an engagement pressure for the clutch. However, although a highly accurate control is generally necessary in order to directly control the engagement pressure corresponding to the creep pressure, this control accuracy is reduced due to accuracy errors of an aged deterioration and variations in each member's precision. Hence, it is difficult that such a desired control for directly controlling the engagement pressure corresponding to the creep pressure is achieved. In the case where the engagement pressure controlled to correspond to the creep pressure varies (has variation error) due to the reduction in control accuracy, there is a following possibility. Namely, when the engagement pressure is higher than a desired value, the abrupt burst-out and the vibration of the vehicle are generated. Moreover when the engagement pressure is lower than the desired value, a creep torque is not produced and then the vehicle runs down a hill in a backward direction of the vehicle.

It is, therefore, an object of the present invention to provide control apparatus and method for an automatic transmission, which is devised to achieve a stable restart of the vehicle at the time of the restart after the idle stop.

According to one aspect of the present invention, there is provided a control apparatus for an automatic transmission, comprising: an engine; a torque converter connected with the engine; an oil pump driven by the engine; a starting clutch adapted to be engaged by an engagement pressure produced by the oil pump to transmit propelling power of a vehicle at a start time of the vehicle; and a controller including an idle stop control section configured to deactivate the engine when the vehicle is in a stopped state and a predetermined condition is satisfied, and to restart the engine when the predetermined condition becomes not to be satisfied, and an engagement-pressure control section configured to control the engagement pressure while the starting clutch shifts from in a disengaged state to in an engaged state, and to carry out a learning control to correct the engagement pressure of the starting clutch in accordance with a state of a creep start of the vehicle, when the idle stop control section restarts the engine.

According to another aspect of the present invention, there is provided a control apparatus for an automatic transmission, comprising: an engine; an pump driven by the engine; clutch means for transmitting propelling power of a vehicle, the clutch means being adapted to be engaged by an engagement pressure produced by the pump at a start time of the vehicle; idle stop control means for deactivating the engine when the vehicle is in a stopped state and a predetermined condition is satisfied, and restarting the engine when the predetermined condition becomes not to be satisfied; and engagement-pressure control means for controlling the engagement pressure while the clutch means shifts from in a disengaged state to in an engaged state, and carrying out a learning control to correct the engagement pressure of the clutch means in accordance with a state of a creep start of the vehicle, when the idle stop control means restarts the engine.

According to still another aspect of the present invention, there is provided a control method for an automatic transmission adapted to be connected to an engine through a starting clutch, the starting clutch being adapted to be engaged by an engagement pressure to transmit propelling power of a vehicle, the control method comprising: deactivating the engine when the vehicle is in a stopped state and a predetermined condition is satisfied; restarting the engine when the predetermined condition becomes not to be satisfied; and carrying out a learning control to correct the engagement pressure of the starting clutch in accordance with a state of a creep start of the vehicle by controlling the engagement pressure while the starting clutch shifts from in a disengaged state to in an engaged state, when the engine is restarted.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

Figure 1:
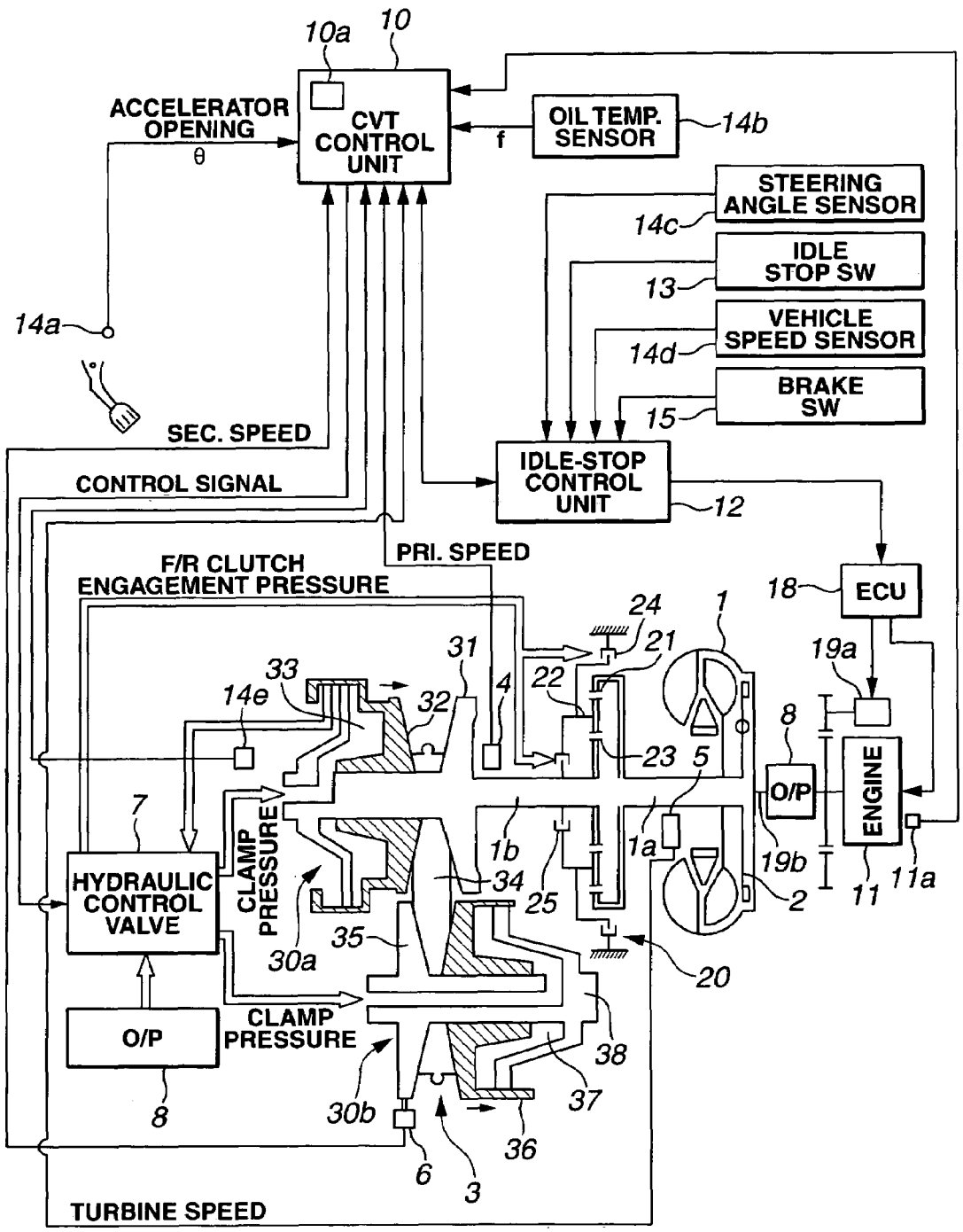
FIG. 1 is a schematic diagram showing a control configuration for a belt-type continuously-variable transmission, according to the present invention.

At first, a control apparatus for an automatic transmission in a first embodiment according to the present invention will now be explained. FIG. 1 is a schematic diagram showing a control configuration for a belt-type continuously-variable transmission 3 (hereinafter, referred to as CVT 3) in the first embodiment.

FIG. 1 represents a torque converter 1, a lockup clutch 2, CVT 3, a primary rotational speed sensor 4, a turbine rotational speed sensor 5, a secondary rotational speed sensor 6, a hydraulic control valve unit 7, an engine 11, an oil pump 8 driven by engine 11, a CVT control unit 10 including a creep-pressure learning section 10a, an idle-stop control unit 12, an idle stop switch 13, an accelerator opening sensor 14a, an oil temperature sensor 14b, a steering angle sensor 14c for sensing steering angle of a steering wheel, a vehicle speed sensor 14d for sensing a vehicle speed, a line pressure sensor 14e for sensing a line pressure, a brake switch 15 for sensing ON or OFF of a brake pedal, an engine control unit 18, a starter motor 19a, and an engine output shaft 19b.

Engine output shaft 19b is connected with oil pump 8 and torque converter 1 serving as a rotation transmitting mechanism, and is equipped with lockup clutch 2 for connecting engine 11 with CVT 3. The output side of torque converter 1 is connected with a turbine shaft 1a. Turbine shaft 1a is connected with a ring gear 21 of a forward/reverse switching mechanism 20.

Forward/reverse switching mechanism 20 includes a planetary gear train. This planetary gear train is comprised of ring gear 21 connected with turbine shaft 1a, a pinion carrier 22, and a sun gear 23 connected with a transmission input shaft 1b. Pinion carrier 22 includes a reverse brake 24 for fixing pinion carrier 22 to a transmission casing, and a forward clutch (starting clutch) 25 for connecting pinion carrier 22 with transmission input shaft 1b in an integrated fashion. Forward clutch 25 is adapted to be engaged by hydraulic pressure produced by oil pump 8 to transmit propelling power of the vehicle, for example at a start time of the vehicle.

A primary pulley 30a of CVT 3 is provided at the end portion of transmission input shaft 1b. CVT 3 includes primary pulley 30a, a secondary pulley 30b, a belt 34 for transmitting rotation force (torque) of primary pulley 30a to secondary pulley 30b, and the like. Primary pulley 30a includes a fixed sheave (conical disc) 31 which rotates integrally with transmission input shaft 1b, and a movable sheave 32 which is installed so as to face against fixed sheave 31 and cooperates with fixed sheave 31 to define (or form) a V-shaped pulley groove. Moreover, movable sheave 32 can move in an axial direction of transmission input shaft 1b, in accordance with hydraulic pressure supplied to a primary-pulley cylinder chamber 33.

Secondary pulley 30b is provided on a driven shaft 38. Secondary pulley 30b includes a fixed sheave 35 which rotates integrally with driven shaft 38, and a movable sheave 36 which is installed so as to face against fixed sheave 35 and cooperates with fixed sheave 35 to define a V-shaped pulley groove. Moreover, movable sheave 36 can move in an axial direction of driven shaft 38 in accordance with hydraulic pressure supplied to a secondary-pulley cylinder chamber 37.

Driven shaft 38 is fixed to a drive gear (not shown). This drive gear drives a drive shaft connected to wheels, through a pinion provided on an idler shaft, a final gear, and differential gears (unit).

Rotation force (torque) is inputted from engine output shaft 19b to CVT 3 by being transmitted through torque converter 1 and forward/reverse switching mechanism 20 to transmission input shaft 1b. The rotation force of transmission input shaft 1b, is transmitted to the differential gears through primary pulley 30a, belt 34, secondary pulley 30b, driven shaft 38, the drive gear, an idler gear, the idler shaft, the pinion, and the final gear.

While transmitting the power as mentioned above, a speed ratio (i.e., transmission ratio) between primary pulley 30a and secondary pulley 30b can be varied by varying radius of a contact position between belt 34 and movable sheave 32 of primary pulley 30a or movable sheave 36 of secondary pulley 30b. Namely, the contact radius is varied by moving movable sheave 32 and/or movable sheave 36 in the axial direction. In other words, arc radius of a winding of belt 34 relative to each pulley 30a, 30b can be continuously varied. Such a control for varying a width of the V-shaped pulley groove is carried out by CVT control unit 10, by means of a hydraulic control applied to primary-pulley cylinder chamber 33 or secondary-pulley cylinder chamber 37.

CVT control unit 10 receives a turbine rotational speed Nt derived from turbine rotational speed sensor 5, an accelerator opening (degree) θ from accelerator opening sensor 14a, an oil temperature f within CVT3 from oil temperature sensor 14b, a primary (pulley) rotational speed Npri from primary rotational speed sensor 4, a secondary rotational speed Nsec from secondary rotational speed sensor 6, the line pressure from line pressure sensor 14e, and the like. CVT control unit 10 calculates a control signal on the basis of these received signals, and outputs the calculated control signal to hydraulic control valve unit 7.

Hydraulic control valve unit 7 receives the control signal from CVT control unit 10, and carries out a shift control by supplying control pressures to primary-pulley cylinder chamber 33 and secondary-pulley cylinder chamber 37.

Idle-stop control unit 12 receives sensor signals from steering angle sensor 14c, idle stop switch 13, vehicle speed sensor 14d, and brake switch 15. Moreover idle-stop control unit 12 and CVT control unit 10 communicate with each other to send such sensor signals, a torque-down control signal, and the like. When CVT control unit 10 determines that the idle stop should be carried out, a command for stopping an idling is outputted from CVT control unit 10 through idle-stop control unit 12 to engine control unit 18. Further, when CVT control unit 10 determines that an engine restart after the idle stop should be carried out, CVT control unit 10 outputs a command for restarting engine 11 to engine control unit 18. Then, engine control unit 18 outputs a motor drive signal to starter motor 19a, and starts engine 11.

In addition, the control apparatus in this embodiment may be configured so that, for example, the idle stop command derived from idle-stop control unit 12 is outputted to a hill hold control section (or, a hill holder device) provided in a brake unit, and thereby a backward running of the vehicle is avoided when the idle stop is executed on an inclined road (hill) and the like. Moreover, idle-stop control unit 12 receives a torque down amount (signal) according to an engagement state of forward clutch 25 at the time of engine restart. Then, an output of engine 11 is controlled in accordance with this torque down amount (i.e., reduced torque) at the time of engine restart.

Figure 2:
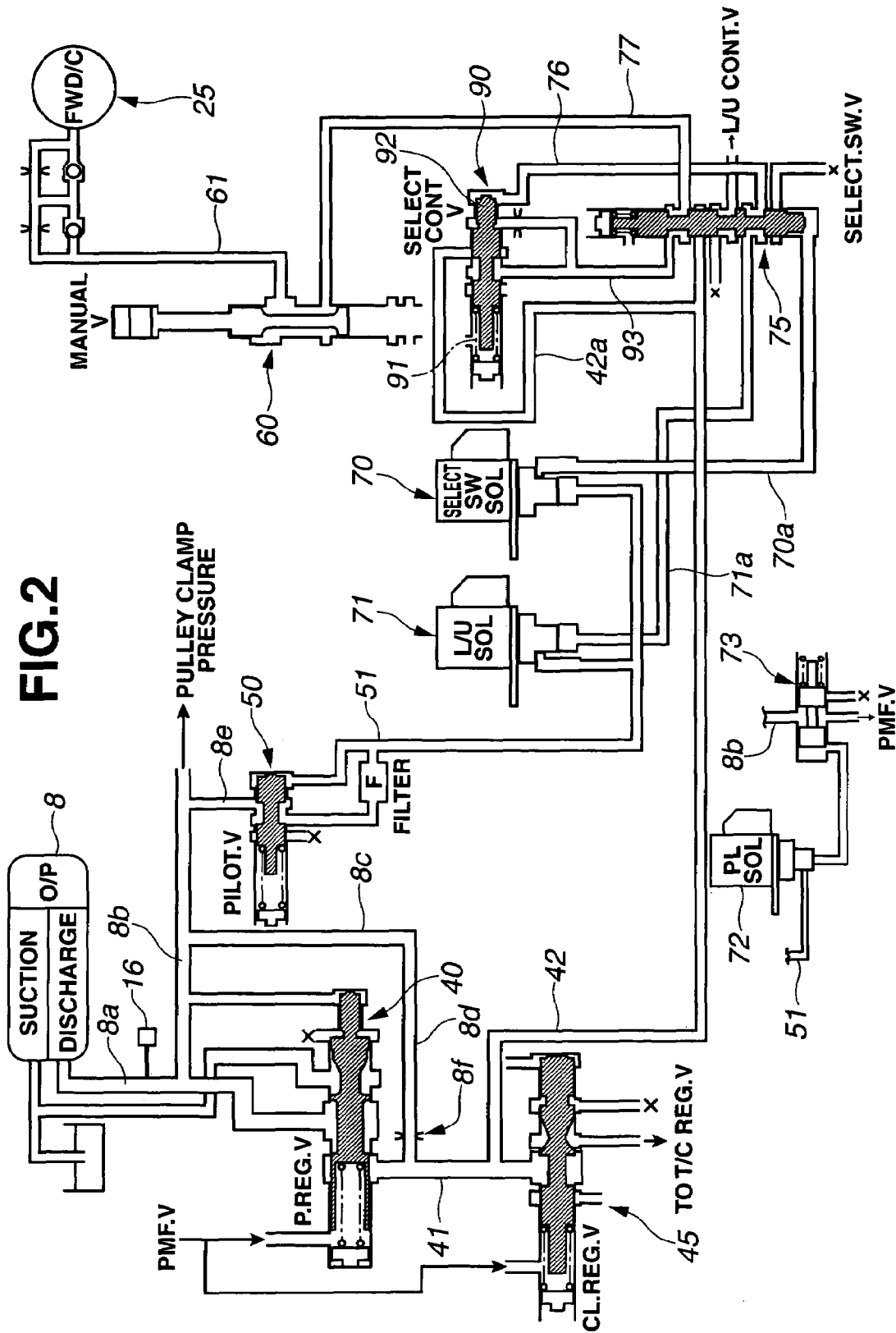
FIG. 2 is a schematic diagram showing a hydraulic circuit for the belt-type continuously-variable transmission, according to the present invention.

FIG. 2 is a schematic diagram showing a hydraulic circuit for the belt-type continuously-variable transmission, mainly in hydraulic control valve unit 7 according to the first embodiment. A pressure regulator valve 40 regulates (or controls) a discharge pressure of oil pump 8, as a line pressure (i.e., pulley clamp pressure). The discharge pressure of oil pump 8 is supplied to pressure regulator valve 40 through an oil passage (or duct) 8a. Oil passage 8a is communicated (connected) with an oil passage 8b. Oil passage 8b serves as a pulley-clamp-pressure supplying passage through which the pulley clamp pressure for clamping belt 34 is supplied to primary-pulley cylinder chamber 33 and secondary-pulley cylinder chamber 37 of CVT 3. Moreover, an oil passage 8e communicated with oil passage 8b serves to supply a base (source) pressure for a pilot valve 50.

A clutch regulator valve 45 regulates or adjusts a forward-clutch pressure from hydraulic pressure drained from pressure regulator valve 40. Pressure regulator valve 40 is communicated (connected) with clutch regulator valve 45 through an oil passage 41. Oil passage 41 is communicated with an oil passage 8d which has an orifice 8f and which is communicated with a line-pressure oil passage 8c. Moreover, oil passage 41 is communicated with an oil passage 42. Oil passage 42 serves to supply hydraulic pressure regulated by clutch regulator valve 45 to a select switching valve 75 and a select control valve 90.

Pilot valve 50 sets a constant pressure which is supplied to a lockup solenoid 71 and a select switching solenoid 70 through an oil passage 51. Output pressure of select switching solenoid 70 is supplied to select switching valve 75 through an oil passage 70a, and controls (an operation of) select switching valve 75. Output pressure of lockup solenoid 71 is supplied to select switching valve 75 through an oil passage 71a.

When a signal for select switching solenoid 70 is ON, the signal (output) pressure of lockup solenoid 71 acts on select control valve 90 as a signal pressure for select control valve 90, through select switching valve 75. When the signal for select switching solenoid 70 is OFF, the signal pressure of lockup solenoid 71 is delivered to a lockup control valve (not shown) through select switching valve 75.

When both of the signal for select switching solenoid 70 and the signal for lockup solenoid 71 are equal to 0, the signal pressure for select control valve 90 is made substantially equal to 0. At this time, a spool valve 92 of select control valve 90 is moved in a right direction of FIG. 2, by spring-load of a return spring 91.

Both of pressure regulator valve 40 and clutch regulator valve 45 are controlled by a pressure-modifier pressure. This pressure-modifier pressure is a signal pressure adjusted from (i.e., based on) the line pressure by a pressure modifier valve 73. Pressure modifier valve 73 to which the line pressure is supplied is controlled by a line pressure solenoid 72. Pressure-modifier pressure is adjusted so as to be higher than signal pressures by (derived from) the solenoids 70, 71, and 72.

Since the pressure-modifier pressure higher than the signal pressure derived from the solenoid 72 (or 70, 71) controls pressure regulator valve 40 and clutch regulator valve 45, a pressure regulating performance is enhanced in a relatively high-pressure region. On the other hand, the signal pressure by lockup solenoid 71 can control or regulate hydraulic pressure delicately (accurately) in a low-pressure region, and however the maximum hydraulic pressure capable of being regulated by the signal pressure of lockup solenoid 71 is limited.

In an engagement control for forward clutch 25 in the first embodiment, an engagement pressure control for forward clutch 25 is carried out by using clutch regulator valve 45 after forward clutch 25 became in a completely engaged state. On the other hand, before forward clutch 25 becomes in the completely engaged state (for example, during the engagement control at the time of start of the vehicle), the engagement pressure control for forward clutch 25 is carried out by using lockup solenoid 71.

When the engagement control is carried out under the condition where forward clutch 25 is in a disengaged (opened) state, select switching solenoid 70 is turned ON. Thereby, the (direct) communication between oil passage 42 and an oil passage 77 is disconnected, and hydraulic pressure within oil passage 42 is supplied through select control valve 90 to oil passage 77. At the same time, the communication between the signal pressure of lockup solenoid 71 and the lockup control valve (outside of FIG. 2) is disconnected, and the signal pressure of lockup solenoid 71 is supplied to select control valve 90 as an opposing pressure for select control valve 90.

Thereby, the signal pressure of lockup solenoid 71 controls hydraulic pressure within oil passage 42 serving as the engagement pressure for forward clutch 25, by using select control valve 90. This control using select control valve 90 enables the engagement pressure control to be more delicate (accurate) than the case using clutch regulator valve 45.

When the above-mentioned engagement control performed under the condition where forward clutch 25 is in disengaged state is finished, both of select switching solenoid 70 and lockup solenoid 71 are made turned OFF, and the direct communication between oil passage 42 and oil passage 77 is established (connected). Thereby, hydraulic pressure regulated by clutch regulator valve 45 is directly supplied to forward clutch 25 as the engagement pressure for forward clutch 25. In this first embodiment, such a configuration which allows the engagement control for forward clutch 25 to be switched (changed) as described above is defined as a base-pressure switching type.

Figure 3:
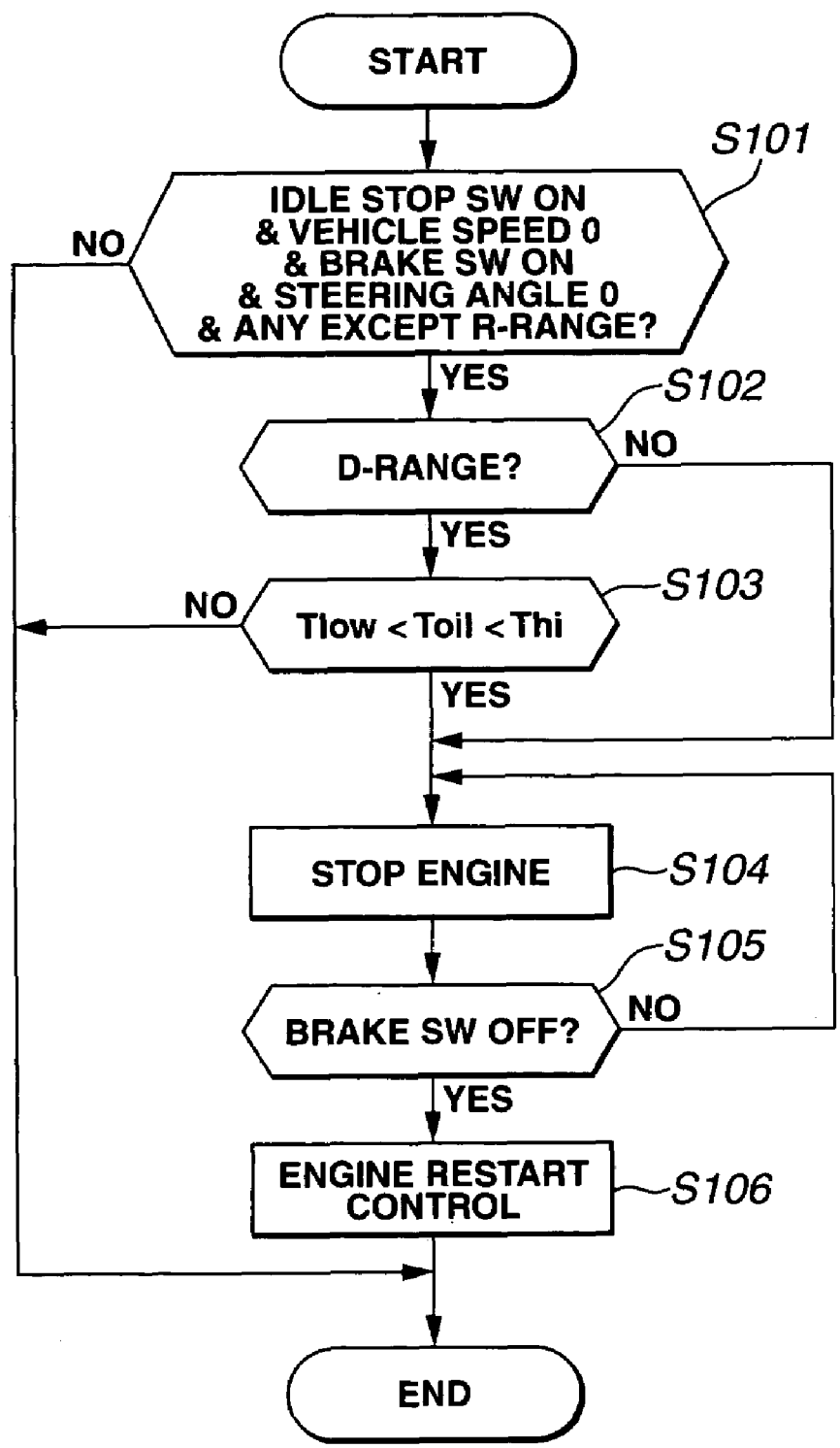
FIG. 3 is a flowchart showing a basic control process of idle stop control according to the present invention.

FIG. 3 is a flowchart showing a basic control process of idle stop control in the first embodiment according to the present invention.

At step S101, the controller (i.e., an idle stop control section in the controller including CVT control unit 10, idle-stop control unit 12, and engine control unit 18) judges whether or not an idle-stop permission flag is ON, whether or not idle stop switch 13 is ON, whether or not the vehicle speed is equal to 0, whether or not brake switch 15 is ON, whether or not the steering angle of the steering wheel is substantially equal to 0, and whether or not a selected position of a shift lever is any one except for Reverse-range. If these relationships are all established at step S101 (YES at step S101), the program proceeds to step S102. If at least one of these relationships is not established at step S101, the controller does not carry out the idle stop control.

At step S102, the controller judges whether or not the selected position is Drive-range. If the controller determines that the Drive-range has been selected, the program proceeds to step S103. If the answer of step S102 is NO, the program proceeds to step S104.

At step S103, the controller judges whether or not oil temperature $T_{oil}$ (f) is higher than a predetermined lower limit temperature $T_{low}$ and is also lower than a predetermined upper limit temperature $T_{hi}$. If the controller determines that oil temperature $T_{oil}$ (f) is higher than lower limit temperature $T_{low}$ and is lower than upper limit temperature $T_{hi}$ (YES at step S103), the program proceeds to step S104. If the answer of step S103 is NO, the program proceeds to step S101.

At step S104, the controller deactivates (stops) engine 11 and the program proceeds to step S105.

At step S105, the controller judges whether or not brake switch 15 is OFF. If the controller determines that brake switch 15 is in the condition of OFF, the program proceeds to step S106.

At step S106, the controller carries out a restart control for engine 11.

Namely in detail, engine 11 is stopped; when a driver intends to require the idle stop control, the vehicle is in a stopped state, the brake pedal is in a depressed state, the steering angle of steering wheel is equal to 0, and the selected position of shift lever is not R-range. Idle stop switch 13 serves to indicate a driver's request to perform or finish the idle stop. For example, idle stop switch 13 may be configured to become ON (energized) when an ignition key is turned. The criterion that the steering angle is equal to 0, is used for prohibiting the idle stop in the case where the vehicle makes once stop while the vehicle is turning to the right, for example.

The idle-stop permission flag is set by the other control logic element and the like. The idle-stop permission flag is set to OFF, when it is conceivable that the favorable engine restart control cannot be achieved even if the idle stop is carried out. Concretely for example, this includes a case that the engagement control for forward clutch 25 (about which a detailed explanation will be given later) cannot be successfully achieved, and a case that starter motor 19a cannot be driven due to insufficient charge status of a battery. However not limited to these examples.

Next, the controller judges whether or not oil temperature $T_{oil}$ is higher than lower limit temperature $T_{low}$ and is lower than upper limit temperature $T_{hi}$, at step S103. The controller judges this criterion for the following possibility. Namely, there is a possibility that a predetermined amount of oil cannot be supplied to each engagement element due to viscous resistance of oil before the start time of a normal combustion of the engine (i.e., steady-state combustion of the engine or completely burning state of the engine), if the oil temperature is not higher than the predetermined lower limit temperature. Moreover, if the oil temperature is not lower than the predetermined upper limit temperature, a volumetric efficiency of oil pump 8 is reduced and a leak amount of oil at each valve is increase, due to a reduction in viscous resistance of oil. Hence in the same manner, there is a possibility that the predetermined amount of oil cannot be supplied to each engagement element before the normal combustion of the engine if the oil temperature is not lower than the predetermined upper limit temperature.

Next at step S105, the controller determines that the driver intends to start the engine (i.e., has a request for the engine restart), when the brake pedal is released. Moreover, the controller is configured to determine that the driver intends to start the engine, when idle stop switch 13 is turned to OFF (de-energized) even in the condition where the brake pedal is in the depressed state. By this configuration, the idle stop can be finished (or released) in accordance with the driver's request. For example, the driver can finish the idle stop when the driver feels hot inside a vehicle room. Namely, when the engine is stopped as a result of the idle stop, an increased load is put on the battery and thereby there is possibility that the driver cannot use an air conditioner sufficiently. Under such a situation, the driver can finish the idle stop lest the driver comes to be unable to use sufficiently the air conditioner. Therefore, the idle stop control is configured to be performed more responsively according to the driver's intent.

Next at step S106, the controller restarts the engine by using starter motor 19a when the controller determines that the driver intends to start the engine. Namely, the controller restarts the engine when the predetermined condition(s) satisfied at step S101 becomes not to be satisfied.

When the engine is in stopped state, oil pump 8 is also in stopped state. Hence, the oil supplied to forward clutch 25 and respective primary-pulley cylinder chamber 33 and secondary-pulley cylinder chamber 37 of CVT 3 goes away (i.e., drains) through oil passages, and thereby hydraulic pressure (within each of forward clutch 25, primary-pulley cylinder chamber 33, and secondary-pulley cylinder chamber 37) is reduce. When engine 11 is restarted, forward clutch 25 has been in disengaged state. Hence, hydraulic pressure needs to be supplied to forward clutch 25 at the time of restart of engine 11.

With respect to such a reduction in hydraulic pressure, primary-pulley cylinder chamber 33 and secondary-pulley cylinder chamber 37 are configured in the following manner. Namely, in the case where the time interval during which the idle stop continues to be executed is short, the oil stored in respective primary-pulley cylinder chamber 33 and secondary-pulley cylinder chamber 37 is not drained so much, and some amount of oil is secured. On the other hand, in the case where the engine has been in stopped state for a long time, the oil gradually drains from respective primary-pulley cylinder chamber 33 and secondary-pulley cylinder chamber 37.

[Transition of Engagement State of the Forward Clutch]

When forward clutch 25 is engaged at the time of restart of the vehicle, the engagement state of forward clutch 25 makes a transition as follows.

(1) Precharge phase: A state where working fluid is being charged into forward clutch 25 (until forward clutch 25 is filled with oil).

(2) Stroke phase: A state where a coned disc spring and a looseness (and the like) of a clutch plate of forward clutch 25 are being crushed or pressed until a piston stroke of forward clutch 25 finishes.

(3) Engaging phase: A state where hydraulic pressure is being increased at a predetermined rate with the lapse of time, after the piston stroke of forward clutch 25 finished.

(4) Engagement finishing phase: A state where a slip of the clutch plate has not yet been eliminated when a predetermined time interval has elapsed.

(5) Completely engaging phase: A state where the slip of the clutch plate becomes eliminated, and forward clutch 25 becomes (or shifts) in completely engaged state.

In this embodiment according to the present invention, such transition phases (1)~(5) are defined.

[Learning Control for Engagement Pressure]

In order to directly control the engagement pressure corresponding to a creep pressure (appropriate to a creep torque of the vehicle), a highly accurate control is generally necessary. However, it is difficult to avoid the reduction of this control accuracy due to accuracy errors by an aged deterioration of each (engagement) member, variations in each member's precision and the like. Therefore, in this embodiment, when the idle stop control section restarts engine 11, a learning control for the engagement pressure is performed so as to correct a command value for this engagement pressure to an appropriate value based on a current situation (current value) having the errors by the aged deterioration of each engagement member and variations in each member. Namely, the controller (i.e., an engagement-pressure control section in the controller including CVT control unit 10, idle-stop control unit 12, engine control unit 18, and hydraulic control valve 7) carries out the learning control to correct the engagement pressure of forward clutch 25 in accordance with the state of creep start of the vehicle. On the basis of this correction, the engagement pressure of forward clutch 25 is controlled while forward clutch 25 shifts from in the disengaged state to in the completely engaged state.

Specifically at first, a peak rotational speed $Ne_{max}$ of engine 11 during time interval between a start of normal combustion of engine 11 and the end of Stroke phase, is sensed. Then, it is determined whether or not the leaning correction is carried out, on the basis of peak rotational speed $Ne_{max}$ and a predetermined rotational speed Neo corresponding to the creep pressure (or creep torque). If the leaning correction is carried out, an elapsed time T from the start time of normal combustion of engine 11 to a time when forward clutch 25 begins to transmit torque (i.e., forward clutch 25 becomes substantially engaged) is measured. Namely, an elapsed time T from the start time of normal combustion of engine 11 to a time when primary rotational speed Npri substantially becomes higher than 0 (Npri>0) is measured. Then, a correction quantity is determined on the basis of this measured value.

~Learning Control Based on Engine Peak Speed~

[A Case Where the Engine Peak Speed is Within Predetermined Tolerance]

If the sensed peak rotational speed $Ne_{max}$ of engine 11 ranges within a tolerance ($\pm\epsilon$) of predetermined rotational speed Neo corresponding to the creep pressure, namely if the relationship $|Ne_{max}-Neo|\leq\epsilon$ is satisfied; engine 11 is in a warm-up state. Hence, a delay of finish time of the clutch engagement due to an idle engine speed raised in the case where engine 11 is in a cold state, is not generated in this warm-up state. Therefore, the learning correction for engagement pressure is carried out in this state.

[A Case Where the Engine Peak Speed is Out of Predetermined Tolerance]

If the relationship $|Ne_{max}-Neo|>\epsilon$ is satisfied, engine 11 is in the cold state. In this state, engine speed Ne rapidly increases after the engine restart. Hence, peak rotational speed $Ne_{max}$ becomes much higher than predetermined rotational speed Neo. Accordingly, there is a possibility that excessively high torque relative to an engagement capacity of forward clutch 25 required at the time of the creep (of the vehicle) is inputted to forward clutch 25.

Hence, if engine speed Ne ranges out of the tolerance ($\pm\epsilon$) of predetermined rotational speed Neo, the elapsed time from the start time of normal combustion of engine 11 to the time when the engagement pressure of forward clutch 25 reaches the creep pressure is measured so as to be longer than the actual time. Therefore, the learning correction for engagement pressure is not carried out in this state.

~Learning Control Based on Elapsed Time to Reach Creep Pressure~

[A Case Where the Elapsed Time is Upwardly Out of Tolerance]

If elapsed time T from the start time of engine normal combustion to the time when primary rotational speed Npri substantially becomes higher than 0, is longer than the sum of a predetermined time period To and an error $\delta 1$, namely $T>To+\delta 1$; an increasing speed in engagement pressure of forward clutch 25 is low (as compared to a needed speed), and thereby the time when the engagement pressure of forward clutch 25 reaches the pressure corresponding to the creep pressure is delayed. In this case, the creep pressure cannot be secured by the time point $To+\delta 1$. Due to this, there is a fear that the vehicle runs down a hill in a backward direction of the vehicle, for example when the vehicle starts on the hill.

Hence, if the relationship $T>To+\delta 1$ is satisfied, namely if elapsed time T is upwardly out of the tolerance; by adding the correction quantity $\Delta P$ ($\Delta P>0$) to a basic hydraulic-pressure command value $P^*$, a corrected target hydraulic-pressure command value $Pt=P^*+\Delta P$ is set as the (target) engagement pressure of forward clutch 25 at the time of next execution of the engagement pressure learning control for forward clutch 25. Namely, at the time of next execution of the learning control for forward clutch 25, the value of corrected target hydraulic-pressure command value $Pt=P^*+\Delta P$ serves as basic hydraulic-pressure command value $P^*$. Thus, the creep pressure is secured before predetermined time period To has passed, by increasing the target pressure (value) for forward clutch 25 namely by accelerating the increasing speed in engagement pressure of forward clutch 25.

[A Case Where the Elapsed Time is Downwardly Out of Tolerance]

On the other hand, if the measured elapsed time T is shorter than the difference between predetermined time period To and an error $\delta 2$, namely $T<To-\delta 2$; the increasing speed in engagement pressure of forward clutch 25 is high (as compared to a needed speed), and thereby the time when the engagement pressure of forward clutch 25 reaches the pressure corresponding to the creep pressure is too early. In this case, the engagement pressure of forward clutch 25 reaches the creep pressure before the time period $To-\delta 2$ has passed. Due to such a rapid engagement of forward clutch 25, there is a fear that a vibration or an abrupt burst-out of the vehicle is generated.

Hence, if the relationship $T<To-\delta 2$ is satisfied, namely if elapsed time T is downwardly out of the tolerance; by subtracting the correction quantity $\Delta P$ ($\Delta P>0$) from basic hydraulic-pressure command value $P^*$, corrected target hydraulic-pressure command value $Pt=P^*-\Delta P$ is set as the (target) engagement pressure of forward clutch 25 at the time of next execution of the engagement control for forward clutch 25. Thus, the rapid engagement is avoided, by reducing the target pressure (value) for forward clutch 25.

[A Case Where the Elapsed Time is Within Tolerance]

If the measured elapsed time T ranges within the tolerance, namely if the relationship $To-\delta 2 \leq T \leq To+\delta 1$ is satisfied; the engagement pressure of forward clutch 25 reaches the pressure corresponding to the creep pressure by taking a time period ranging between the smaller criterion of time period $To-\delta 2$ and the greater criterion of time period $To+\delta 1$ (i.e., reaches the creep pressure at some time point within the tolerance), and then the creep torque is produced. Therefore, it is unnecessary to carry out the correction for engagement pressure of forward clutch 25.

[Process of Creep-pressure Learning Control]

Figure 4:
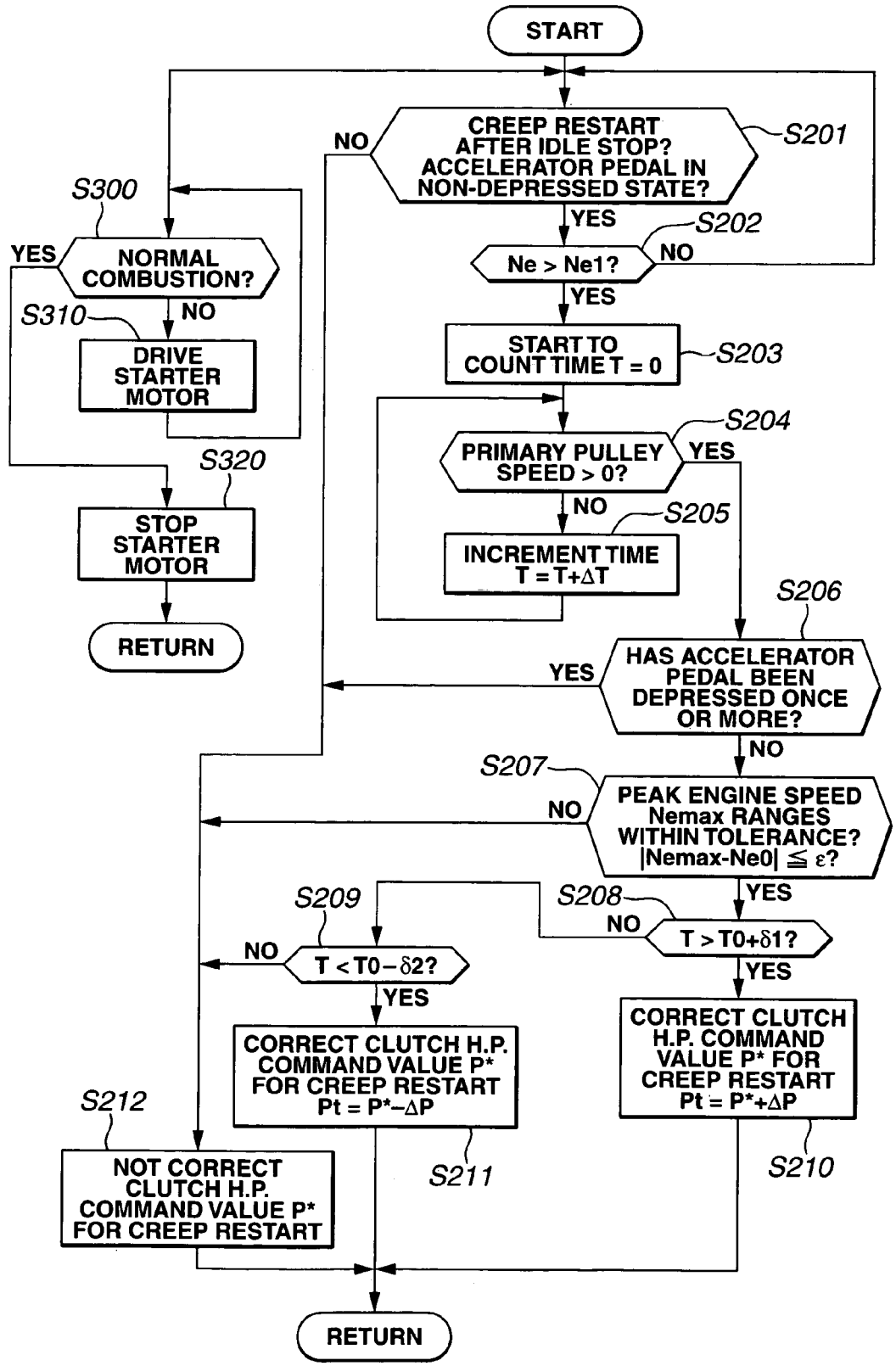
FIG. 4 is a flowchart showing a process of a learning control of creep pressure in a first embodiment according to the present invention.

FIG. 4 is a flowchart showing a process of the learning control of the creep pressure in the first embodiment. Each step of the control process will now be explained.

At step S201, the controller (i.e., an engagement-pressure control section in the controller including CVT control unit 10, idle-stop control unit 12, engine control unit 18, and hydraulic control valve 7) judges whether or not the vehicle restarts (i.e., is restarting) after the idle stop has been carried out, and whether or not an accelerator pedal is in a non-depressed state. If these relationships are all satisfied at step S201, namely if YES at step S201; the program proceeds to step S202. If at least one of these relationships is not satisfied at step S201, namely if NO at step S201; the program proceeds to step S212.

At step S202, the controller judges whether or not actual engine speed Ne is higher than a predetermined speed Ne1, namely whether or not Ne>Ne1, in order to determine the normal combustion of engine 11. If YES at step S202, the program proceeds to step S203. If NO at step S202, the program returns to step S201.

At step S203, the controller start to measure the elapsed time T by using a timer. Namely, the controller sets T to 0 in the timer. Then, the program proceeds to step S204.

At step S204, a primary speed judging section 130 of the controller judges whether or not primary (pulley) speed Npri is higher than a value equal to or near 0, namely Npri>0. If YES at step S204, the program proceeds to step S206. If NO at step S204, the program proceeds to step S205.

At step S205, the controller increments time in the timer. Namely, the controller adds a counted elapsed time $\Delta T$ to T (T=T+$\Delta T$). Then, the program returns to step S204.

At step S206, the controller judges whether or not the accelerator pedal has a history of depression from start time of this control process (routine). Namely the controller judges whether or not the accelerator pedal has been depressed once or more. If YES at step S206, the program proceeds to step S212. If NO at step S206, the program proceeds to step S207.

At step S207, the controller judges whether or not peak speed value $Ne_{max}$ of the engine rotational speed ranges within the tolerance ($\pm\epsilon$) of predetermined rotational speed Neo. Namely, the controller judges whether or not the relationship $|Ne_{max}-Neo| \leq \epsilon$ is satisfied. If YES at step S207, the program proceeds to step S208. If NO at step S207, the program proceeds to step S212.

At step S208, an elapsed time judging section 160 of the controller judges whether or not elapsed time T counted at steps S203 through S205 is longer than the upward tolerance (+$\delta 1$) of predetermined time period To. Namely, the controller judges whether or not the relationship T>To+$\delta 1$ is satisfied. If YES at step S208, the program proceeds to step S210. If NO at step S208, the program proceeds to step S209.

At step S209, elapsed time judging section 160 of the controller judges whether or not time T counted at steps S203 through S205 is shorter than the downward tolerance (−$\delta 2$) of predetermined time period To. Namely, the controller judges whether or not the relationship T<To−$\delta 2$ is satisfied. If YES at step S209, the program proceeds to step S211. If NO at step S209, the program proceeds to step S212.

At step S210, the controller adds correction value $\Delta P$ to basic hydraulic-pressure command value P*, and sets corrected target hydraulic-pressure command value Pt=P*+$\Delta P$ to be outputted to forward clutch 25 at the time of next start of the vehicle. Then, this control routine is terminated.

At step S211, the controller subtracts correction value $\Delta P$ from basic hydraulic-pressure command value P*, and sets corrected target hydraulic-pressure command value Pt=P*−$\Delta P$ to be outputted to forward clutch 25 at the time of next start of the vehicle. Then, this control routine is terminated.

At step S212, the controller does not correct basic hydraulic-pressure command value P*, and sets target hydraulic-pressure command value Pt=P* to be outputted to forward clutch 25 at the time of next start of the vehicle. Namely, the controller sets the current target hydraulic-pressure command value as a next-time target hydraulic-pressure command value which is used for next execution of this learning control. Then, this control routine is terminated.

[Process of Driving Control for Starter Motor]

At steps S300 to S320, a process of the driving control for the starter motor is shown in FIG. 4.

At step S300, the controller judges whether or not engine 11 has been already in a normal combustion state. If YES at step S300, the program proceeds to step S320. If NO at step S300, the program proceeds to step S310. It is noted that the judgment on the normal combustion state may be performed by determining whether or not the engine speed is higher than a predetermined speed, however the method of judging the normal combustion state is not limited to this.

At step S310, the controller drives starter motor 19a, and the program returns to step S300.

At step S320, the controller stops (i.e., deactivates) starter motor 19a, and this routine is terminated.

[Variation with Time in Creep-pressure Learning Control]

Figure 5:
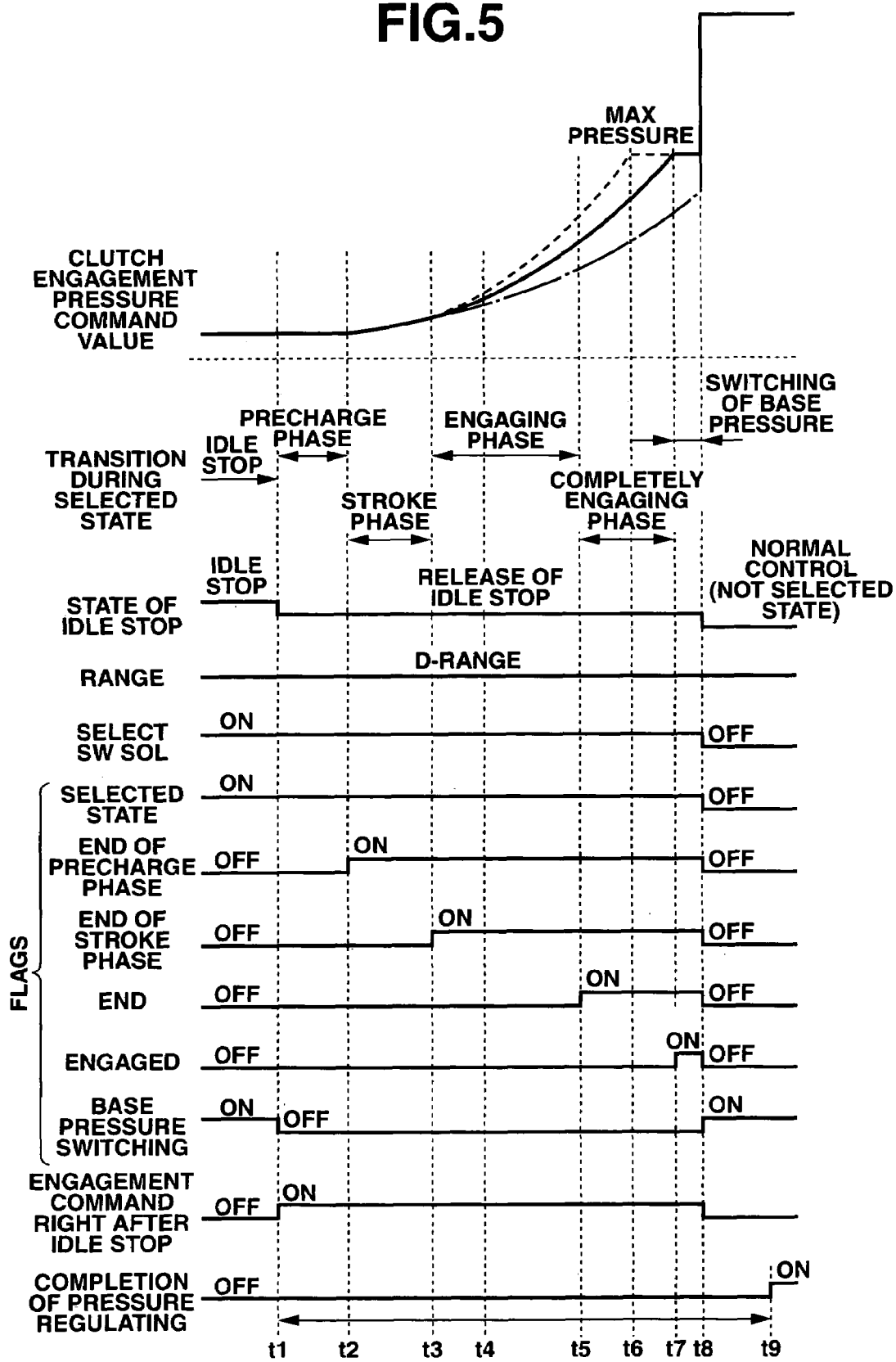
FIG. 5 is a time chart showing time variations in the learning control of creep pressure in the first embodiment.

FIG. 5 is a time chart showing time variations in the creep-pressure learning control of this embodiment. Basic hydraulic-pressure command value P* is indicated in a solid line, corrected target hydraulic-pressure command value Pt=P*+$\Delta P$ resulting from the adding correction to basic hydraulic-pressure command value P* is indicated in a dashed line, and corrected target hydraulic-pressure command value Pt=P*−$\Delta P$ resulting from the subtracting correction is indicated in an alternate-long-and-short dashed line, in FIG. 5.

~Time Point t1~

At a time point t1, a re-engagement command is outputted after the idle stop, and a flag for the (switchable) base pressure is changed to OFF, as shown in FIG. 5. Thereby, working fluid begins to be charged (or supplied) into forward clutch 25, and the Precharge phase starts.

~Time Point t2~

At a time point t2, forward clutch 25 finishes being filled with working fluid, and a flag for the end of Precharge phase (i.e., a flag representing the end state of Precharge phase) is changed to ON as shown in FIG.5. At this time, the piston stroke of forward clutch 25 is started, and the Stroke phase begins. During the Stroke phase, the coned disc spring and the looseness (and the like) of the clutch plate of forward clutch 25 are crushed or pressed.

~Time Point t3~

At a time point t3, the piston stroke finishes, and a flag for the end of Stroke phase is changed to ON as shown in FIG.5. At this time, the Engaging phase begins. During the Engaging phase, the engagement force of forward clutch 25 is gradually strengthened by increasing the target hydraulic pressure value at a predetermined rate (or constant rate) with the passage of time.

~Time Interval Between t3 and t4~

During a time interval from t3 to t4, hydraulic-pressure command value P* is slightly increased as compared to the time interval from t2 to t3. Even if forward clutch 25 has not yet become in a substantially engaged state (defined by a state of Npri >0 in this embodiment, or also called an engagement finished state) at time point t3 due to causes such as hydraulic variation, forward clutch 25 is certainly brought in the substantially engaged state at a time point between t3 and t4.

~Time Point t4~

At a time point t4, forward clutch 25 has already been in the substantially engaged state. After time point t4, hydraulic-pressure command value P* is further increased.

~Time Point t5~

At a time point t5, a time period $\Delta t$ for the Engaging phase has just passed, a flag for the end of the Engaging phase (or, a flag for the end of engagement proceeding) is changed to ON as shown in FIG.5.

~Time Point t6~

At a time point t6, corrected target hydraulic-pressure command value Pt=P*+$\Delta P$ resulting from the adding correction to basic hydraulic-pressure command value P* reaches an adjustable maximum pressure (adjustable by lockup solenoid 71).

~Time Point t7~

At a time point t7, basic hydraulic-pressure command value P* reaches the adjustable maximum pressure. Moreover, the base pressure (i.e., switchable source pressure for forward clutch 25) begins to be switched.

~Time Point t8~

At a time point t8, the switching of the base pressure is finished, and the flag for the base pressure is changed to ON as shown in FIG. 5. At this time point, all the other flags are changed to OFF. Then, this control performed after the release of idle stop, is terminated.

~Time Point t9~

At a time point t9, a pressure regulating (for forward clutch 25 and the like) is accomplished. Accordingly, a flag for the completion of pressure regulating subsequent to the idle stop is changed to ON as shown in FIG. 5.

[Comparison Related to Operational Configurations and Advantages, Between a Comparative Example and the Embodiments According to the Present Invention]

In a vehicle employing the idle stop function, the engine rotational speed blows up (i.e., rapidly increases) to a speed higher than a required engine speed, by the engine's normal combustion carried out immediately after the restart of the engine. Accordingly an excessively high torque is inputted to a clutch. Thereby, there is a fear that a vibration and an abrupt burst-out of the vehicle are caused. Hence, in an comparative example (an earlier technology), a regenerative motor is mounted to absorb the engine speed higher than the required engine speed in order to avoid the input of the excessively high torque to the clutch, after the engine is restarted.

However in the above-described comparative technique, since the regenerative motor having a high regenerative ability is necessary in general, there is a problem that the cost increases accordingly. On the other hand, in order to directly control the clutch's engagement pressure corresponding to the creep pressure immediately after the restart, an extremely highly accurate control is necessary. This control accuracy (controllability) is affected due to accuracy errors by the aged deterioration of each member, variations in each member's precision and the like. Hence, in the case where the engagement pressure controlled to correspond to the creep pressure has variation error due to the reduction in control accuracy, there is a following possibility. Namely, when the controlled engagement pressure is higher than a desired value (i.e., creep pressure), there is a fear that the abrupt burst-out and the vibration of the vehicle are caused. Moreover when the controlled engagement pressure is lower than the desired value, there is a fear that a creep torque is not produced and then for example the vehicle runs down a hill in the backward direction of the vehicle.

(1) On the contrary in the embodiments according to the present invention, creep-pressure learning section 10*a* carries out the learning correction of target hydraulic-pressure command value P* (target engagement pressure) for forward clutch 25 in accordance with current state at the time of the creep of the vehicle, in the case where idle-stop control unit 12 restarts engine 11.

Thereby, it becomes possible that the engagement pressure of forward clutch 25 is controlled to be an optimal engagement pressure level in response to the engagement pressure's errors due to the aged deterioration of each member and the variations in each member's precision, at the time of creep of the vehicle. Therefore, a stable restart of the vehicle can be achieved at the time of restart of the vehicle after the idle stop, without using the regenerative motor and the like and without receiving the affect of accuracy reduction due to the aged deterioration and the individual difference of each member. Furthermore, the cost cut can also be achieved since the regenerative motor is unnecessary.

The other advantages according to the present invention will now be explained below.

(2) Creep-pressure learning section 10*a* judges whether or not forward clutch 25 has begun to transmit torque, by using primary rotational speed Npri. Primary pulley 30*a* is a rotation member connected with forward clutch 25 in a driven side of the forward clutch 25. Moreover, this primary rotational speed Npri is a rotational speed from which the automatic transmission makes reduced secondary rotational speed Nsec if the vehicle speed is low. Hence, primary rotational speed Npri is relatively high even if the vehicle speed is low. Therefore, creep-pressure learning section 10*a* can accurately determine the vehicle restart based on primary rotational speed Npri.

(3) In the learning control for engagement pressure, elapsed time T from the restart time of engine 11 to the time when forward clutch 25 begins to transmit torque is measured. Namely, elapsed time T from the restart time of engine 11 to the time when primary rotational speed Npri substantially becomes higher than 0 (i.e., starts to rotate) is measured. If the measured elapsed time T is longer than the sum of predetermined time period To and allowable error $\delta 1$, namely T>To+$\delta 1$; by adding correction quantity $\Delta P$ ($\Delta P$>0) to basic hydraulic-pressure command value P*, corrected target hydraulic-pressure command value Pt=P*+$\Delta P$ is set as the (target) engagement pressure of forward clutch 25 which is used for next execution of the restart engagement control for forward clutch 25. If the measured elapsed time T is shorter than the difference between predetermined time period To and allowable error $\delta 2$, namely if T<To−$\delta 2$; by subtracting correction quantity $\Delta P$ ($\Delta P$>0) from basic hydraulic-pressure command value P*, corrected target hydraulic-pressure command value Pt=P*−$\Delta P$ is set as the target engagement pressure of forward clutch 25 used for next execution of the engagement control for forward clutch 25.

Thereby, the next-time target pressure is increased as compared to the current target pressure, in the case where the time when the engagement pressure of forward clutch 25 reaches the pressure corresponding to the creep pressure is delayed due to a low increasing speed of engagement pressure of forward clutch 25. Accordingly, the creep pressure is secured before predetermined time period To has passed, by accelerating the increasing speed in engagement pressure of forward clutch 25. Therefore, a mis-engagement of forward clutch 25 can be avoided. On the other hands, the next-time target pressure is decreased as compared to the current target pressure, in the case where the time when the engagement pressure of forward clutch 25 reaches the pressure corresponding to the creep pressure is too early due to a high increasing speed of engagement pressure of forward clutch 25. Accordingly, the rapid engagement is avoided, and the vibrations of the vehicle can be suppressed.

(4) Moreover in the learning control for engagement pressure according to the present invention, the restart time of engine 11 is defined by the start time of normal combustion of engine 11. Thereby, dispersion in time before the start time of normal combustion of engine 11, is eliminated. Accordingly, the time period measurement from the restart time of engine 11 can be carried out with high precision.

(5) Furthermore in the learning control for engagement pressure according to the present invention, in the case where peak rotational speed $Ne_{max}$ of engine 11 ranges within the tolerance (±ε) of predetermined rotational speed Neo corresponding to the creep pressure, namely if the relationship $|Ne_{max}-Neo|\leq\epsilon$ is satisfied; the correction of target engagement pressure (value) is executed. Thereby, the correction of target engagement pressure is not carried out, in the case where excessively high or low torque is inputted to forward clutch 25 as compared with the required engagement capacity of forward clutch 25 at the time of creep of the vehicle, for example in the case where engine speed Ne blows up (i.e., rapidly increases). Since the learning correction is carried out in the case where engine speed Ne is a normal value (within the predetermined range), an improper learning of the measured elapsed time due to dispersion in engine speed Ne can be avoided.

(6) Furthermore in the learning control for engagement pressure according to the present invention, a first engagement-pressure supplying section which is capable of regulating only hydraulic pressure ranging in the relatively low-pressure region, performs the engagement pressure control for forward clutch 25 at the time of restart of engine 11 (i.e., while the learning control is being carried out). The first engagement-pressure supplying section includes lockup solenoid 71, select switching solenoid 70, select switching valve 75, and select control valve 90. On the other hand, a second engagement-pressure supplying section includes clutch regulator valve 45, pressure modifier valve 73, and line pressure solenoid 72. The second engagement-pressure supplying section is capable of regulating only hydraulic pressure ranging in the high-pressure region higher than the above low-pressure region. After forward clutch 25 has been in the completely engaged state (i.e., after the learning control for engagement pressure at restart time of engine 11 has finished), the engagement pressure of forward clutch 25 is controlled by using clutch regulator valve 45 (the second engagement-pressure supplying section) in substitution. It is noted that the first engagement-pressure supplying section can control the engagement pressure more delicately than the second engagement-pressure supplying section. After the control by clutch regulator valve 45 started, namely after the base pressure was switched; the torque down amount (command) of engine 11 is gradually reduced. Then, the torque down of engine 11 is released when the engine torque reaches a predetermined value. Thereby, it can be avoided that high engine torque is abruptly inputted to belt-type continuously-variable transmission 3. Hence, for example a belt slip can be prevented in CVT 3.

Next, a control apparatus for an automatic transmission in a second embodiment according to the present invention will now be explained with reference to FIG. 6. Since a basic structure of the second embodiment is similar as that of the first embodiment, some points different from the first embodiment will now be described. In the first embodiment, creep-pressure learning section 10a judges whether or not primary rotational speed Npri is substantially higher than 0 (Npri>0), for the purpose of determining the creep start timing of the vehicle (i.e., for the purpose of determining the start time of torque transfer), as shown in step S204 of FIG. 4. Namely, the elapsed time until the time when forward clutch 25 begins to transmit torque is defined by elapsed time T until the time when primary rotational speed Npri substantially becomes higher than 0 (Npri>0). Thereby, it is determined whether or not the correction for (target) engagement pressure should be carried out, as shown in steps S208 and S209 of FIG. 4.

On the other hand, in the second embodiment, the controller judges whether or not a difference between turbine rotational speed Nt and primary rotational speed Npri is greater than a value equal to or near 0, namely whether or not the relationship Nt−Npri>0 is satisfied. Namely, the controller determines that forward clutch 25 has not yet become in the substantially engaged state, if the relationship Nt−Npri>0 is satisfied. On the other hand, the controller determines that forward clutch 25 has been substantially engaged if Nt−Npri=0. Namely, the elapsed time until the time when forward clutch 25 begins to transmit torque is defined by elapsed time T until the time when the difference between turbine rotational speed Nt and primary rotational speed Npri becomes substantially equal to 0 (Nt−Npri=0). Thereby, it is determined whether or not the correction for (target) engagement pressure should be carried out.

[Process of Creep-pressure Learning Control in Second Embodiment]

Figure 6:
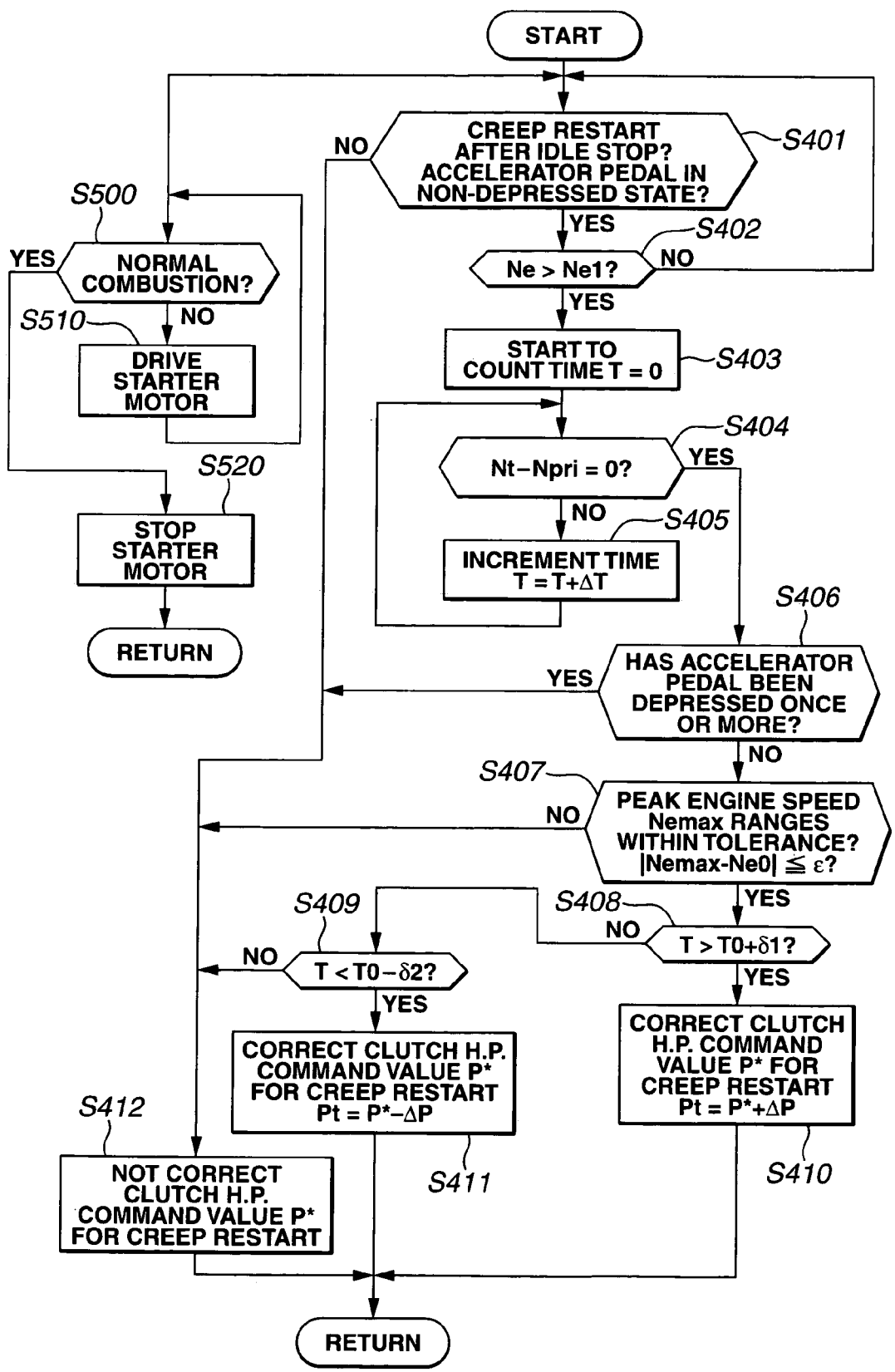
FIG. 6 is a flowchart showing a process of the learning control of creep pressure in a second embodiment according to the present invention.

FIG. 6 is a flowchart showing a process of the learning control of creep pressure in the second embodiment.

Steps S401 to S403 are similar as steps S201 to S203 of the creep-pressure learning control shown in FIG. 4.

At step S404, primary speed judging section 130 of the controller (CVT control unit 10) judges whether or not the difference speed between turbine rotational speed Nt and primary rotational speed Npri is equal to or near 0 (Nt−Npri≈0). If YES at step S404, the program proceeds to step S406. If NO at step S404, the program proceeds to step S405.

Steps S405 to S407 are similar as steps S205 to S207 of the creep-pressure learning control shown in FIG. 4.

At step S408, elapsed time judging section 160 of the controller judges whether or not elapsed time T from the start time of time-counting to the time when the difference speed between turbine rotational speed Nt and primary rotational speed Npri becomes equal to or near 0 (counted at steps S403 to S405), is longer than the upward tolerance (+δ1) of predetermined time period To. Namely, elapsed time judging section 160 judges whether or not the relationship T>To+δ1 is satisfied. If YES at step S408, the program proceeds to step S410. If NO at step S408, the program proceeds to step S409.

At step S409, elapsed time judging section 160 of the controller judges whether or not elapsed time T from the start time of time-counting to the time when the difference speed between turbine rotational speed Nt and primary rotational speed Npri becomes equal to or near 0, is shorter than the downward tolerance (−δ2) of predetermined time period To. Namely, elapsed time judging section 160 judges whether or not the relationship T<To−δ2 is satisfied. If YES at step S409, the program proceeds to step S411. If NO at step S409, the program proceeds to step S412.

Steps S410 to S412 are similar as steps S210 to S212 of the creep-pressure learning control shown in FIG. 4.

[Operational Configurations and Advantages in the Second Embodiment According to the Present Invention]

(7) In the second embodiment, the controller determines whether forward clutch 25 has not yet been substantially engaged, or forward clutch 25 has been already substantially engaged, by using the difference speed Nt−Npri between turbine rotational speed Nt and primary rotational speed Npri. The sensed difference speed Nt−Npri represents a slip speed (caused due to the slip) of forward clutch 25. Hence, the engagement state of forward clutch 25 can be recognized in detail, by sensing the difference speed Nt−Npri. Therefore, the control accuracy of the leaning control can be enhanced.

(8) Moreover in the second embodiment, elapsed time T until the time when forward clutch 25 becomes substantially engaged (or in the engagement finished state) is measured. In other words, elapsed time T until the time when the difference speed between turbine rotational speed Nt and primary rotational speed Npri becomes equal to or near 0, is measured. Then, if the measured elapsed time T is longer than the sum of predetermined time period To and allowable error δ1, namely T>To+δ1; by adding the correction quantity ΔP (ΔP>0) to basic hydraulic-pressure command value P*, corrected target hydraulic-pressure command value Pt=P*+ΔP is set as the (target) engagement pressure of forward clutch 25 at the time of next execution of the learning control for forward clutch 25. On the other hand, if the measured elapsed time T is shorter than the difference of predetermined time period To and allowable error δ2, namely T<To−δ2; by subtracting the correction quantity ΔP (ΔP>0) from basic hydraulic-pressure command value P*, corrected target hydraulic-pressure command value Pt=P*−ΔP is set as the (target) engagement pressure of forward clutch 25 at the time of next execution of the learning control for forward clutch 25. Thereby, the condition where the difference speed between turbine rotational speed Nt and primary rotational speed Npri is equal to or near 0, is sensed immediately after forward clutch 25 becomes in a lockup state. Therefore in the second embodiment, the timing when the engagement pressure of forward clutch 25 reaches the creep pressure can be determined more accurately, and advantages and effects mentioned in the first embodiment can be more improved.

According to the present invention; forward clutch (starting clutch) 25 corresponds to clutch means, the idle stop control section in the controller corresponds to idle stop control means, the engagement-pressure control section in the controller corresponds to engagement-pressure control means, at least one element of the first engagement-pressure supplying section corresponds to a first control valve, and at least one element of the second engagement-pressure supplying section corresponds to a second control valve.

This application is based on a prior Japanese Patent Application No. 2005-013438 filed on Jan. 21, 2005. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for an automatic transmission, comprising:
an engine;
a torque converter connected with the engine;
an oil pump driven by the engine;
a starting clutch adapted to be engaged by an engagement pressure produced by the oil pump to transmit propelling power of a vehicle at a start time of the vehicle; and
a controller including
an idle stop control section configured
to deactivate the engine when the vehicle is in a stopped state and a predetermined condition is satisfied, and
to restart the engine when the predetermined condition becomes not to be satisfied, and
an engagement-pressure control section configured
to control the engagement pressure while the starting clutch shifts from in a disengaged state to in an engaged state, and
to carry out a learning control to correct the engagement pressure of the starting clutch in accordance with a state of a creep start of the vehicle, when the idle stop control section restarts the engine.

2. The control apparatus as claimed in claim 1, wherein the engagement-pressure control section is configured to carry out the learning control to correct the engagement pressure of the starting clutch in accordance with an elapsed time from a restart time of the engine to a time when the starting clutch becomes substantially engaged.

3. The control apparatus as claimed in claim 2, wherein the engagement-pressure control section is configured to carry out the learning control
to increase the engagement pressure of the starting clutch, in the case where the elapsed time from the restart time of the engine to the time when the starting clutch becomes substantially engaged is upwardly out of a predetermined tolerance, and
to reduce the engagement pressure of the starting clutch, in the case where the elapsed time is downwardly out of the predetermined tolerance.

4. The control apparatus as claimed in claim 2, wherein the engagement-pressure control section is configured to determine the restart time of the engine by determining a time when a rotational speed of the engine becomes higher than a predetermined speed.

5. The control apparatus as claimed in claim 2, wherein the restart time of the engine is a start time of a normal combustion of the engine.

6. The control apparatus as claimed in claim 2, wherein the engagement-pressure control section is configured to determine the time when the starting clutch becomes substantially engaged,
by determining a time when a rotation member connected with the starting clutch in a driven side of the starting clutch starts to rotate.

7. The control apparatus as claimed in claim 1, wherein while the engagement-pressure control section carries out the leaning control, the engagement-pressure control section controls the engagement pressure of the starting clutch by using a first control valve capable of controlling the engagement pressure more delicately than a second control valve which is used after the leaning control.

8. The control apparatus as claimed in claim 1, wherein the engagement-pressure control section is configured to carry out the leaning control
to measure an elapsed time from a restart time of the engine to a time when a rotation member connected with the starting clutch in a driven side of the starting clutch starts to rotate, and
to increase an engagement-pressure command value for the starting clutch if the measured elapsed time is upwardly out of a predetermined tolerance, and to reduce the engagement-pressure command value if the measured elapsed time is downwardly out of the predetermined tolerance.

9. The control apparatus as claimed in claim 8, wherein the engagement-pressure control section is configured to carry out the leaning control
to increase the engagement-pressure command value used for a next execution of the learning control as compared to the current engagement-pressure command value, if the measured elapsed time is upwardly out of the predetermined tolerance, to set the current engagement-pressure command value as the engagement-pressure command value used for the next execution of the learning control, if the measured elapsed time is within the predetermined tolerance, and to reduce the engagement-pressure command value used for the next execution of the learning control as compared to the current engagement-pressure command value, if the measured elapsed time is downwardly out of the predetermined tolerance.

10. The control apparatus as claimed in claim 9, wherein the rotation member is a primary pulley of the automatic transmission.

11. The control apparatus as claimed in claim 9, wherein the engagement-pressure control section is configured to carry out the leaning control to set the current engagement-pressure command value as the engagement-pressure command value used for the next execution of the learning control, if a peak rotational speed of the engine during a predetermined interval from the restart time of the engine exceeds a predetermined speed.

12. The control apparatus as claimed in claim 1, wherein the engagement-pressure control section is configured to carry out the leaning control
to sense a difference speed between a turbine rotational speed of the torque converter and a rotational speed of a rotation member connected with the starting clutch in a driven side of the starting clutch,
to measure an elapsed time from a restart time of the engine to a time when the sensed difference speed becomes substantially equal to 0, and
to increase an engagement-pressure command value for the starting clutch if the measured elapsed time is upwardly out of a predetermined tolerance, and to reduce the engagement-pressure command value if the measured elapsed time is downwardly out of the predetermined tolerance.

13. The control apparatus as claimed in claim 12, wherein the engagement-pressure control section is configured to carry out the leaning control
to increase the engagement-pressure command value used for a next execution of the learning control as compared to the current engagement-pressure command value, if the measured elapsed time is upwardly out of the predetermined tolerance,
to set the current engagement-pressure command value as the engagement-pressure command value used for the next execution of the learning control, if the measured elapsed time is within the predetermined tolerance, and
to reduce the engagement-pressure command value used for the next execution of the learning control as compared to the current engagement-pressure command value, if the measured elapsed time is downwardly out of the predetermined tolerance.

14. The control apparatus as claimed in claim 13, wherein the rotation member is a primary pulley of the automatic transmission.

15. The control apparatus as claimed in claim 13, wherein the engagement-pressure control section is configured to carry out the leaning control to set the current engagement-pressure command value as the engagement-pressure command value used for the next execution of the learning control, if the engine is in a cold state.

16. A control apparatus for an automatic transmission, comprising:
an engine;
an pump driven by the engine;
clutch means for transmitting propelling power of a vehicle, the clutch means being adapted to be engaged by an engagement pressure produced by the pump at a start time of the vehicle;
idle stop control means for
deactivating the engine when the vehicle is in a stopped state and a predetermined condition is satisfied, and
restarting the engine when the predetermined condition becomes not to be satisfied; and
engagement-pressure control means for
controlling the engagement pressure while the clutch means shifts from in a disengaged state to in an engaged state, and
carrying out a learning control to correct the engagement pressure of the clutch means in accordance with a state of a creep start of the vehicle, when the idle stop control means restarts the engine.

17. A control method for an automatic transmission adapted to be connected to an engine through a starting clutch, the starting clutch being adapted to be engaged by an engagement pressure to transmit propelling power of a vehicle, the control method comprising:
deactivating the engine when the vehicle is in a stopped state and a predetermined condition is satisfied;
restarting the engine when the predetermined condition becomes not to be satisfied; and
carrying out a learning control to correct the engagement pressure of the starting clutch in accordance with a state of a creep start of the vehicle by controlling the engagement pressure while the starting clutch shifts from in a disengaged state to in an engaged state, when the engine is restarted.

* * * * *